United States Patent
Kim et al.

(10) Patent No.: US 11,255,396 B2
(45) Date of Patent: Feb. 22, 2022

(54) FLUID-SEALED ENGINE MOUNT

(71) Applicants: Hyundai Motor Company, Seoul (KR); Kia Motors Corporation, Seoul (KR)

(72) Inventors: Seung Won Kim, Whasung-Si (KR); Hyo Seok Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 113 days.

(21) Appl. No.: 16/696,843

(22) Filed: Nov. 26, 2019

(65) Prior Publication Data

US 2020/0378463 A1 Dec. 3, 2020

(30) Foreign Application Priority Data

May 28, 2019 (KR) .................. 10-2019-0062604

(51) Int. Cl.
*F16F 9/04* (2006.01)
*B60K 5/12* (2006.01)

(52) U.S. Cl.
CPC .......... *F16F 9/0409* (2013.01); *B60K 5/1208* (2013.01)

(58) Field of Classification Search
CPC ........ F16F 9/0409; F16F 13/08; F16F 13/264; F16F 13/22; F16F 13/26; F16F 13/10; F16F 13/1463; B60K 5/1208; B60K 5/1283

See application file for complete search history.

(56) References Cited

U.S. PATENT DOCUMENTS

| | | | | |
|---|---|---|---|---|
| 4,583,723 A * | 4/1986 | Ozawa | ..................... | F16F 13/26 188/267 |
| 5,170,998 A * | 12/1992 | Muramatsu | ............. | F16F 13/26 180/312 |
| 9,033,319 B2 * | 5/2015 | Kim | ....................... | F16F 13/105 267/140.14 |
| 9,719,575 B2 * | 8/2017 | Kojima | .................. | F16F 13/268 |
| 10,436,281 B2 * | 10/2019 | Kim | ...................... | B60K 5/1208 |
| 2015/0069685 A1 * | 3/2015 | Kim | ....................... | F16F 13/08 267/140.13 |
| 2018/0051769 A1 * | 2/2018 | Kim | ....................... | F16F 13/106 |
| 2018/0281579 A1 * | 10/2018 | Kim | ...................... | B60K 5/1208 |
| 2019/0160933 A1 * | 5/2019 | Kim | ....................... | F16F 13/16 |

FOREIGN PATENT DOCUMENTS

KR  10-1511533 B1  4/2015

* cited by examiner

*Primary Examiner* — Pamela Rodriguez
(74) *Attorney, Agent, or Firm* — Morgan, Lewis & Bockius LLP (57) ABSTRACT

A fluid-sealed engine mount may include an insulator integrally formed on an external side of a mount core configured to be coupled to an engine and having a chamber with which fluid for insulation of vibration is sealed; an orifice module mounted below the mount core to divide the chamber into two chambers and having a fluid passage for flow of the fluid; an air chamber provided at a center portion of the orifice module and filled with air; and an elastic membrane mounted above the air chamber at the center portion of the orifice module to seal the air chamber airtightly.

14 Claims, 10 Drawing Sheets

FLUID-SEALED ENGINE MOUNT

CROSS-REFERENCE(S) TO RELATED APPLICATIONS

The present application claims priority to Korean Patent Application No. 10-2019-0062604 filed on May 28, 2019, the entire contents of which is incorporated herein for all purposes by this reference.

BACKGROUND OF THE INVENTION

Field of the Invention

The present invention relates to a fluid-sealed engine mount, more particularly, to a fluid-sealed engine mount that controls behavior of an engine mounted on a vehicle body and isolates vibration.

Description of Related Art

In general, an engine mount is used in a vehicle to control behavior of an engine and isolate vibration of the engine.

In the conventional engine mount, a fluid-sealed engine mount was often used to absorb vibration of the engine, which generates over a wide frequency band.

Figure 9A:
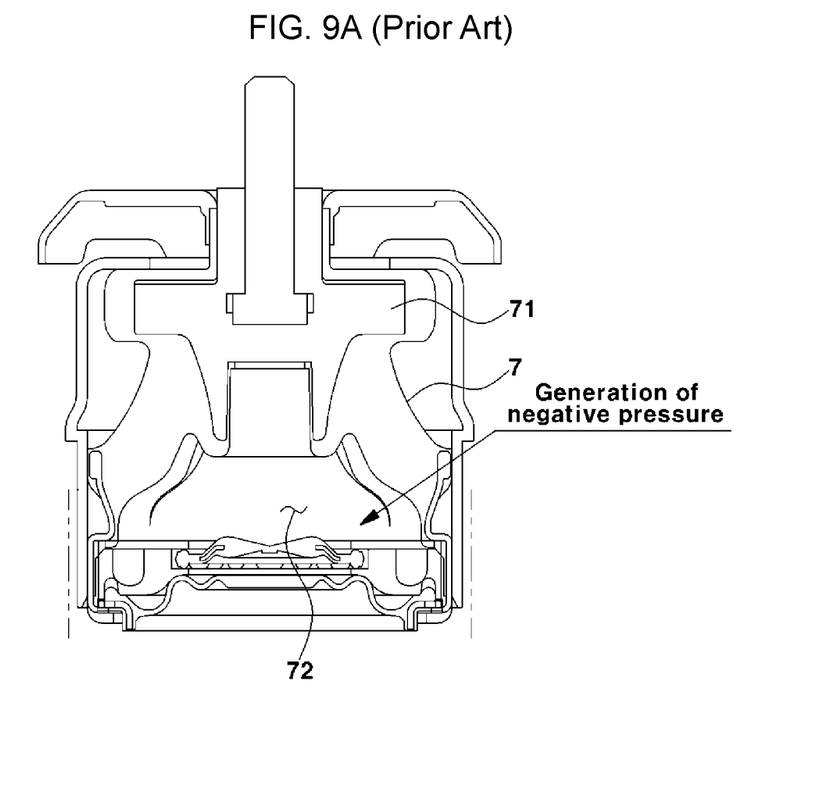
FIG. 9A and FIG. 9B are views showing a conventional fluid-sealed engine mount.
Figure 9B:
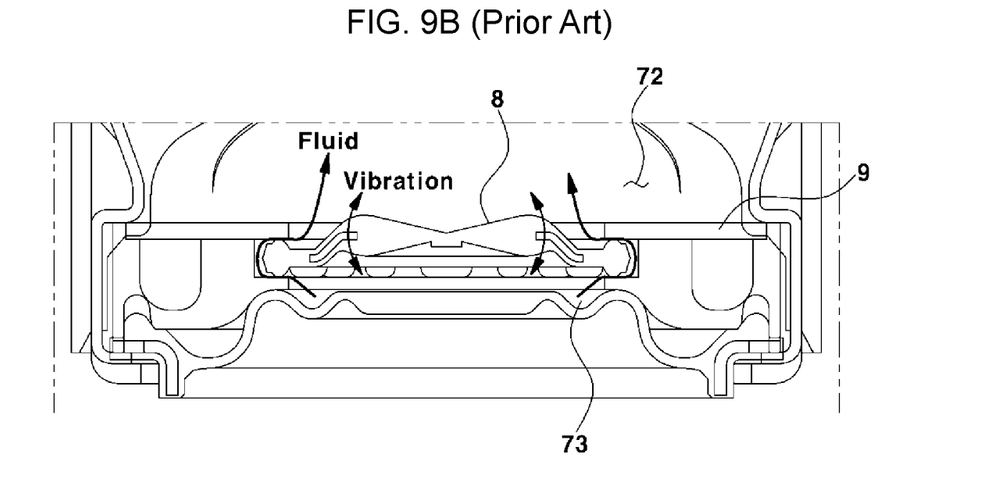

FIGS. 9A and 9B are a view showing a conventional fluid-sealed engine mount.

As shown in FIGS. 9A and 9B, the conventional fluid-sealed engine mount utilizes fluid and an insulator 7 to absorb vibration of the engine. The insulator 7 is attached to a mount core 71 coupled to the engine and receives vibration of the engine. The fluid absorbs vibration of the engine while passing through a flow passage between an upper chamber 72 and a lower chamber 73, which are disposed below the insulator 7. The upper chamber 72 and the lower chamber 73 are defined by a membrane 8 and an orifice module 9 which are disposed therebetween. The membrane 8 is disposed at a center portion of the orifice module 9 and the fluid passes through between the membrane 8 and the orifice module 9. The membrane 8 is attached and constrained to the orifice module 9 at its edge portion and vibrates as the fluid flows.

The engine mount can have improvement of insulation performance in a high frequency band, which results from flow of the fluid passing through between the membrane 8 and the orifice module 9. The membrane 8 constrained to the orifice module 9 is required to move smoothly to allow the fluid to flow. However, flow of the fluid passing through between the membrane 8 and the orifice module 9 causes vibration of the membrane 8. As the movement of the membrane 8 becomes active, noise due to the vibration of the membrane 8 is largely generated. Furthermore, if the membrane 8 is forcibly constrained to the orifice module 9 to prevent generation of such noise, there is a limit to increasing insulation rate of the engine mount in the high frequency band.

There are two major causes of such noise, as follows: The first cause is that the membrane 8 collides with the orifice module 9 while the membrane vibrates. The second cause is that negative pressure is applied to the upper chamber 72 and therefore cavitation is caused due to vaporization of the fluid. As the negative pressure of the upper chamber is increased when the mount core is moved upward, flow rate of the fluid passing through between the membrane 8 and the orifice module 9 is increased, with the result that the membrane 8 vibrates severely. The cavitation is a phenomenon in which bubbles burst in the fluid due to increase of the negative pressure in the upper chamber 72 and at the same time noise is generated.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fluid-sealed engine mount configured for preventing generation of noise which may be caused by vibration of a membrane and a cavitation phenomenon of fluid.

In one aspect of the present invention, there may be provided a fluid-sealed engine mount including: an insulator integrally formed on an external side of a mount core configured to be coupled to an engine and having a chamber with which fluid for insulation of vibration is sealed; an orifice module disposed below the mount core to divide the chamber into two chambers and having a fluid passage for flow of the fluid; an air chamber provided at a center portion of the orifice module and filled with air; and an elastic membrane disposed above the air chamber at the center portion of the orifice module to seal the air chamber airtightly.

The engine mount has the following features. A partition wall protruding at a predetermined height is provided at a top portion of the orifice module. The partition wall may be configured to surround an upper space above the membrane in a circumferential direction of the membrane. The partition wall may be mounted adjacent to an inner edge portion of the membrane in the circumferential direction of the membrane.

The orifice module may be provided at its center portion with a mounting portion to which an edge portion of the membrane is fixed, wherein the mounting portion may be provided at its center portion with an opening hole disposed above the air chamber. The center portion of the membrane may be disposed in the opening hole, wherein the center portion of the membrane may be pulled and moved upwards when the mount core is moved upwards by vibration of the engine. Furthermore, the center portion of the membrane may be pressed and moved downwards when the mount core is moved downwards by vibration of the engine.

Furthermore, the orifice module may be provided at its center portion with a stopper mounted at a predetermined interval below the membrane. The stopper is configured to stop downward movement of the membrane when the center portion of the membrane moved downwards contacts with the stopper.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail such that those skilled in the art can easily carry out the present invention.

Figure 1:
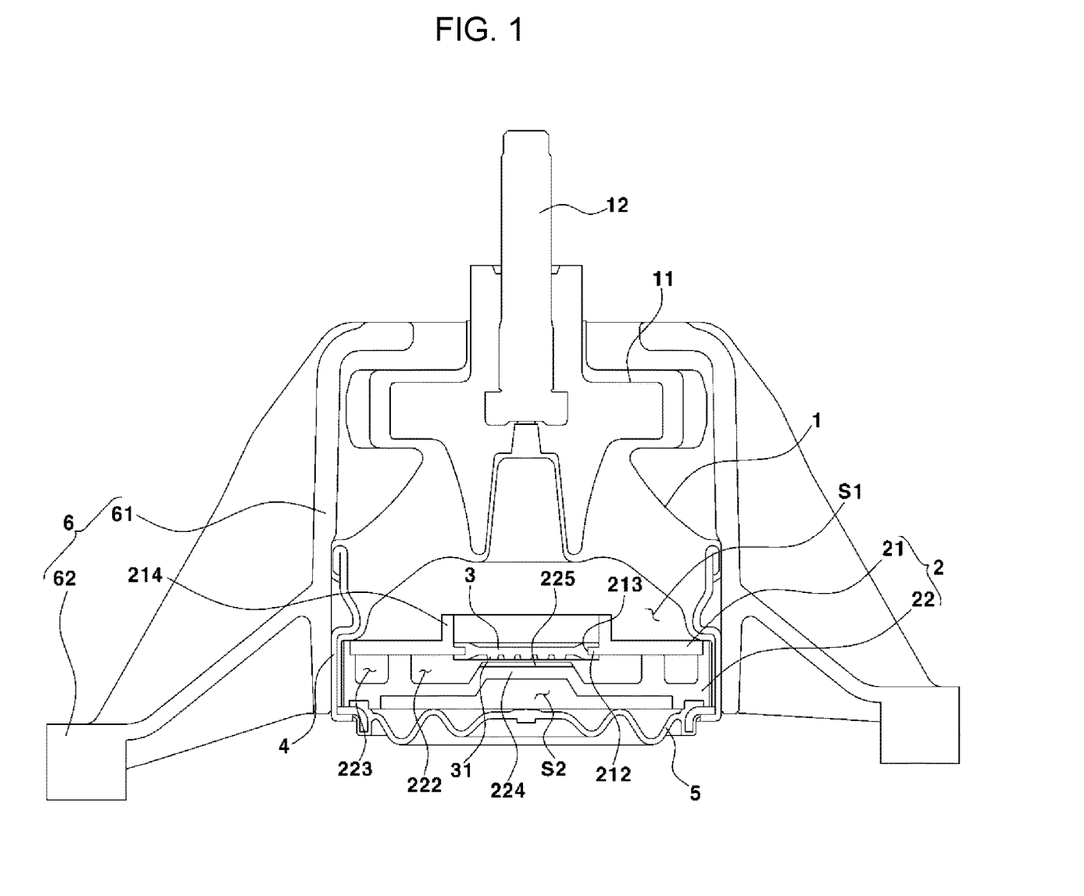
FIG. 1 is a view showing an engine mount according to an exemplary embodiment of the present invention.
Figure 2:
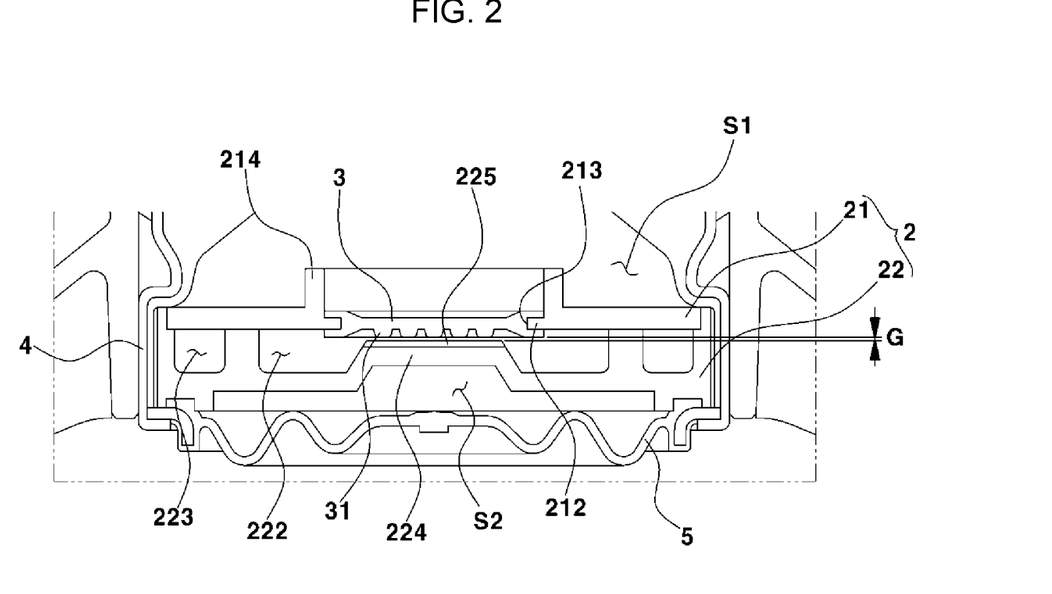
FIG. 2 is an enlarged view of the main portion of FIG. 1.

Referring to FIG. 1 and FIG. 2, the fluid-sealed engine mount according to an exemplary embodiment of the present invention includes an insulator 1, a damping means and an air chamber 222, wherein the damping means includes an orifice module 2 and a membrane 3.

The insulator 1 is configured as an insulator for absorbing vibration input from an engine and may be integrally formed on the external side of the mount core 11 coupled to the engine. An upper portion of the insulator 1 may be integrally formed with a lower portion of the mount core 11 while a lower portion of the insulator 1 may be integrally formed with an internal surface of an external pipe 4 and mounted below the mount core 11. The insulator 1 may be formed by vulcanizing a rubber material having high elasticity.

The mount core 11 may be coupled to the engine via a bolt member 12 provided on the upper portion of the mount core so that it can move integrally with the engine. The insulator 1 is coupled to the engine by the mount core 11 and moves in a response to engine vibration input thereto via the mount core 11. The vibration of the engine may occur in a vertical direction of the vehicle. The insulator 1 can attenuate the vibration of the engine by being elastically deformed in a response to the vibration.

Furthermore, the insulator 1 is provided with a chamber with which fluid for insulation of vibration is sealed. The upper portion of the insulator 1 may be formed in a manner of surrounding the lower portion of the mount core 11 while an internal space corresponding to the chamber may be provided inside the lower portion of the insulator. The orifice module 2 is inserted and disposed into the chamber.

The orifice module 2 is disposed below the mount core 11 and is configured to divide the chamber into an upper chamber S1 and a lower chamber S2. The orifice module 2 includes a fluid passage 223 formed at its edge portion to allow the fluid to flow and an air chamber 222 and the like formed at a center portion thereof. The fluid moves between the upper chamber S1 and the lower chamber S2 through the fluid passage 223 when deformation of the insulator 1 occurs, reducing engine vibration in the low frequency band.

The orifice module 2 is provided at its center portion with a mounting portion 212 formed with an opening hole 213 while the membrane 3 made of an elastic material is attached to the mounting portion 212. The membrane 3 may be formed by vulcanizing a rubber material having high elasticity. In the instant case, an edge portion of the membrane 3 may be integrally molded with and fixed to an external surface of the mounting portion 212. Furthermore, in the instant case, the center portion of the membrane 3 is mounted in the opening hole 213. Moreover, the opening hole 213 is disposed above the air chamber 222. Accordingly, the membrane 3 seals the opening hole 213 by being mounted above the air chamber 222. In other words, the air chamber 222 is sealed by the membrane 3.

Furthermore, a partition wall 214 may be provided at a top end portion of the orifice module 2. The partition wall 214 may protrude at a predetermined height toward the mount core 11. The partition wall 214 may be disposed adjacent to the edge portion of the membrane 3 in a circumferential direction of the membrane 3. In other words, the partition wall 214 may be formed to surround the upper space above the membrane 3 in the circumferential direction of the membrane 3. In other words, the partition wall 214 may have a cylindrical structure surrounding the upper space above the membrane 3.

The partition wall 214 is disposed inside the upper chamber S1. As the partition wall 214 is disposed adjacent to the edge portion of the membrane 3, hydraulic pressure of the fluid in the upper chamber S1 can act more effectively on the membrane 3 when the vibration in the high frequency band is input. The partition wall 214 can reduce dispersion of the hydraulic pressure of the fluid acting on a top end portion of the membrane 3 to the periphery.

The center portion of the membrane 3 can vibrate upwards and downwards as vibration is input to the insulator 1 via the mount core 11. When amplitude of the vibration input to the insulator 1 is equal to or less than a first amplitude a, the center portion of the membrane 3 vibrates in the vertical direction and thus the fluid flows into or from the interior of the partition wall 214 (see FIG. 3). The first amplitude a may be set to a predetermined amplitude value. For example, the first amplitude a may be 0.5 mm. As the center portion of the membrane 3 vibrates with an amplitude equal to or less than the first amplitude a, engine vibration in the high frequency band may be absorbed.

Figure 3:
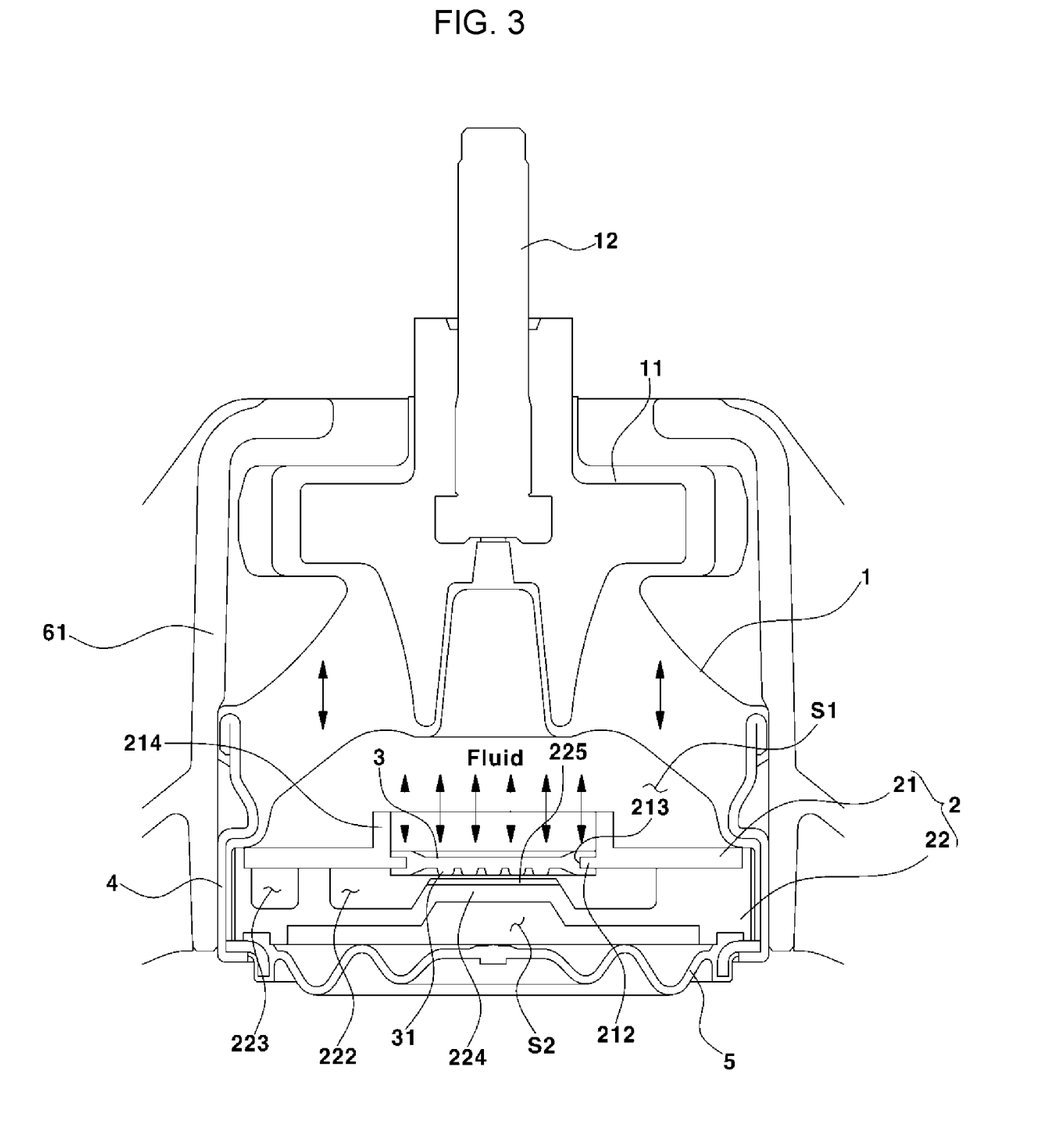
FIG. 3 is a view showing flow of fluid when engine vibration in a high frequency band is absorbed.

As shown in FIG. 3, when the engine vibration with the amplitude equal to or less than the first amplitude a is input, the center portion of the membrane 3 vibrates in the vertical direction and thus the fluid flows into and from the interior of the partition wall 214, with the result that the engine vibration in the high frequency band may be absorbed.

Figure 4:
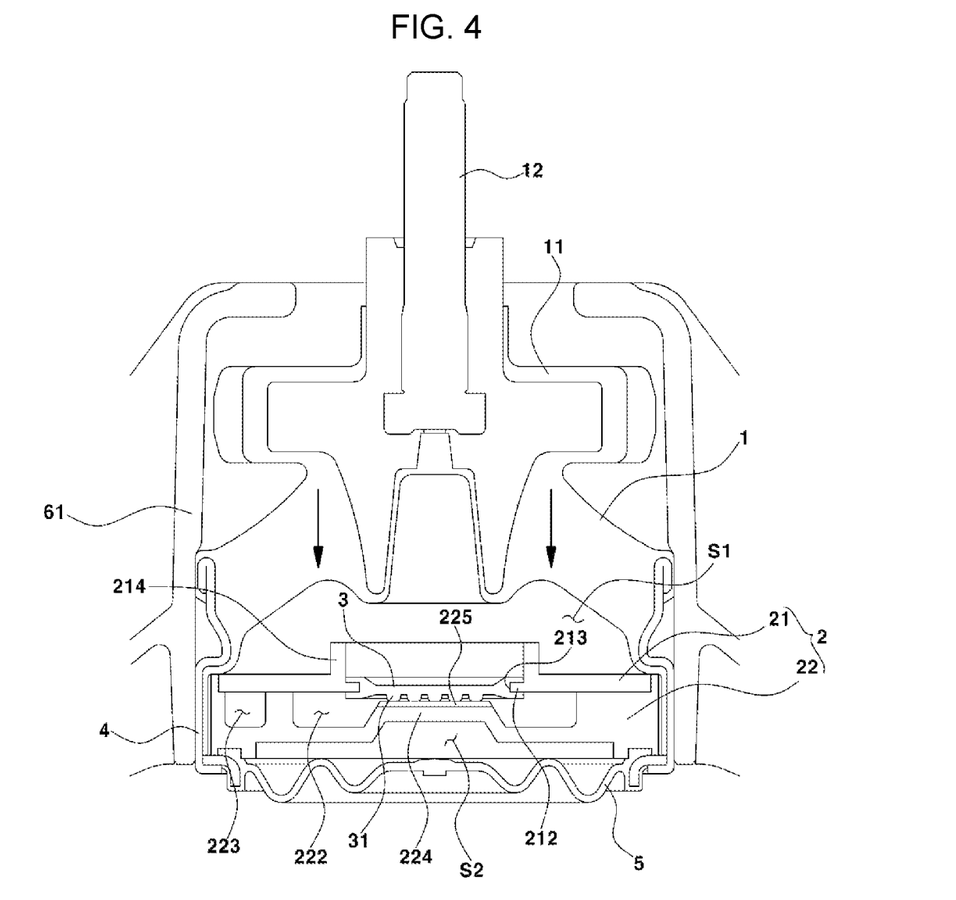
FIG. 4 and FIG. 5 are views showing behavior of a membrane and a compression state of an air chamber when engine vibration in a low frequency band is absorbed.
Figure 5:
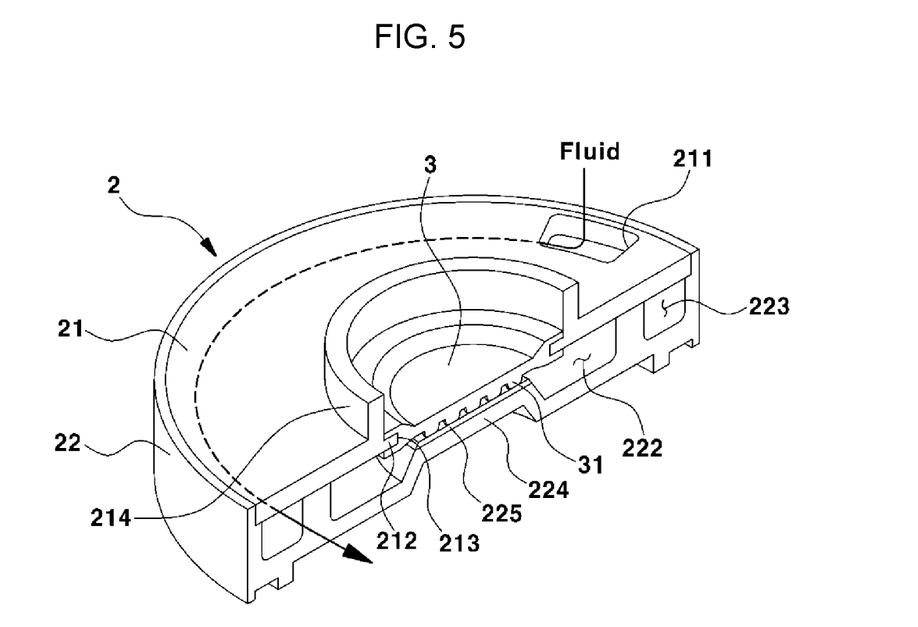

Furthermore, when the engine vibration with the amplitude greater than the first amplitude a is input, the center portion of the membrane 3 vibrates in the vertical direction whereby vibration in the high frequency band is absorbed and at the same time, as shown in FIG. 4 and FIG. 5, the center portion of the membrane 3 is stopped by a stopper 224 whereby fluid flows into the fluid passage 223 so that engine vibration in the low frequency band may be absorbed. As a result, both the engine vibration in the high frequency band the engine vibration in the low frequency band may be simultaneously absorbed so that insulation rate of the engine mount is improved.

The center portion of the membrane 3 may vibrate with an amplitude greater than the first amplitude a when the vehicle travels on an uneven road. For example, the membrane 3 may vibrate with an amplitude of about 1.0 mm during traveling of the vehicle.

Figure 6:
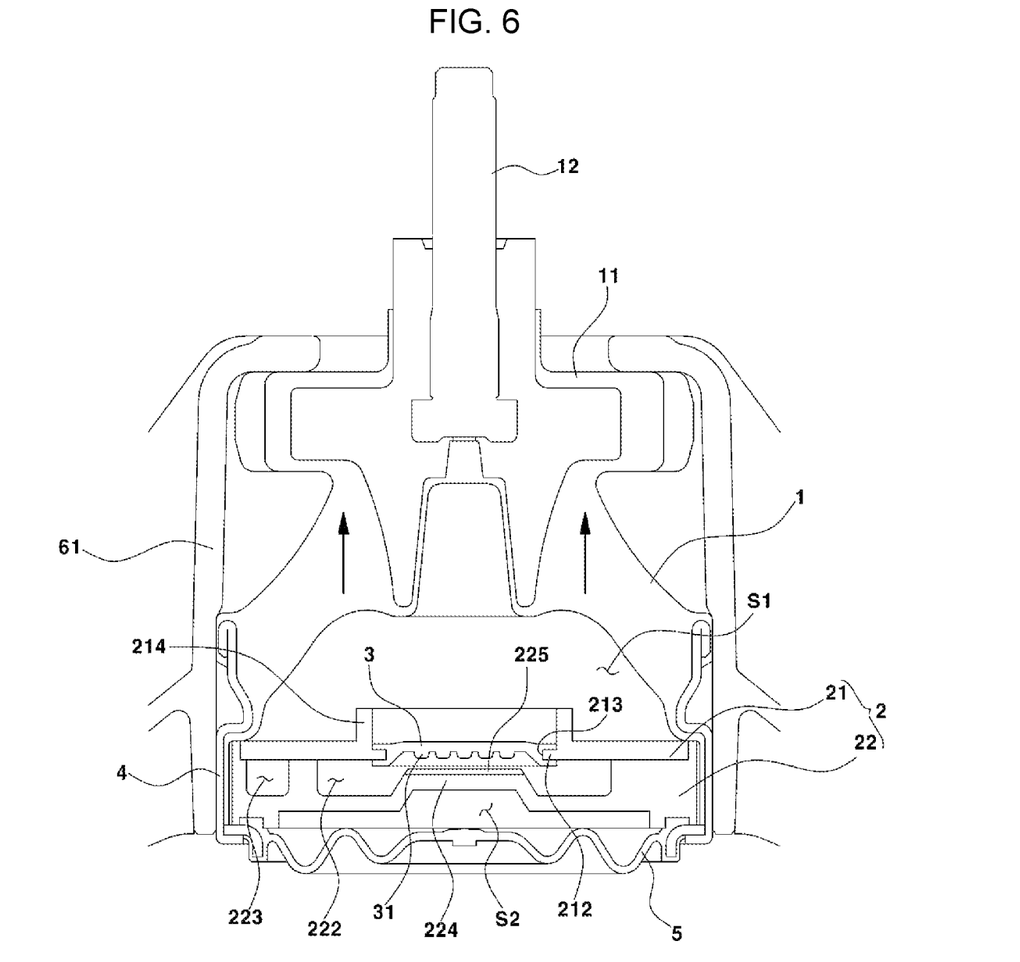
FIG. 6 is a view showing behavior of a membrane and an expansion state of an air chamber when engine vibration in a low frequency band is absorbed.

Furthermore, as shown in FIG. 6, when the mount core 11 is moved upwards by the engine vibration, negative pressure is generated in the upper chamber S1 as the hydraulic pressure in the upper chamber S1 reduces, with the result that the center portion of the membrane 3 is pulled and moved upwards by the negative pressure. At the instant time, air filled in the air chamber 222 expands and pressure of the air becomes lower than the atmospheric pressure.

As shown in FIG. 4 and FIG. 5, when the mount core 11 is moved downwards by the engine vibration, positive pressure is generated in the upper chamber S1 as the hydraulic pressure in the upper chamber S1 increases, with the result that the center portion of the membrane 3 is pressed and moved downwards by the positive pressure. At the instant time, air filled in the air chamber 222 is compressed and pressure of the air becomes higher than the atmospheric pressure.

Vibration amplitude of the membrane 3 may be restricted to be equal to or less than the first amplitude a when the center portion of the membrane 3 vibrates with an amplitude greater than the first amplitude a, such that the fluid can flow in the fluid passage 223, improving damping performance of the engine mount.

The stopper 224 may be provided at the center portion of the orifice module 2 to limit vibration amplitude of the membrane 3. The stopper 224 is mounted at a predetermined interval below the membrane 3 and the air chamber 222 is positioned between the membrane 3 and the stopper 224. The stopper 224 may be provided at the center portion of the lower end portion of the orifice module 2 and may have a configuration protruding upward toward the membrane 3.

The stopper 224 can stop movement of the membrane 3 when the center portion of the membrane 3 is moved downwards and in turn contacts with the stopper 224. Furthermore, an elastic sheet 225 may be provided on a top surface of the stopper 224. The elastic sheet 225 can prevent generation of noise when the center portion of the membrane 3 contacts with and strikes the top surface of the stopper 224. The elastic sheet 225 may be of a thin sheet type using an elastic material.

A plurality of elastic projections 31 may be provided on an under surface of the membrane 3 to allow the membrane 3 to operate smoothly. The elastic projections 31 may protrude toward the stopper 224 from the under surface of the membrane 3. A gap G between the elastic protrusions 31 and the stopper 224 may be set to a value of the first amplitude a. When the center portion of the membrane 3 vibrates with an amplitude greater than the first amplitude a, the elastic protrusions 31 collide with and are compressed against the stopper 224 whereby the membrane 3 may be stopped (see FIG. 4).

Hereinafter, configuration of the orifice module 2 will be described in more detail with reference to FIGS. 2 and 7.

Figure 7:
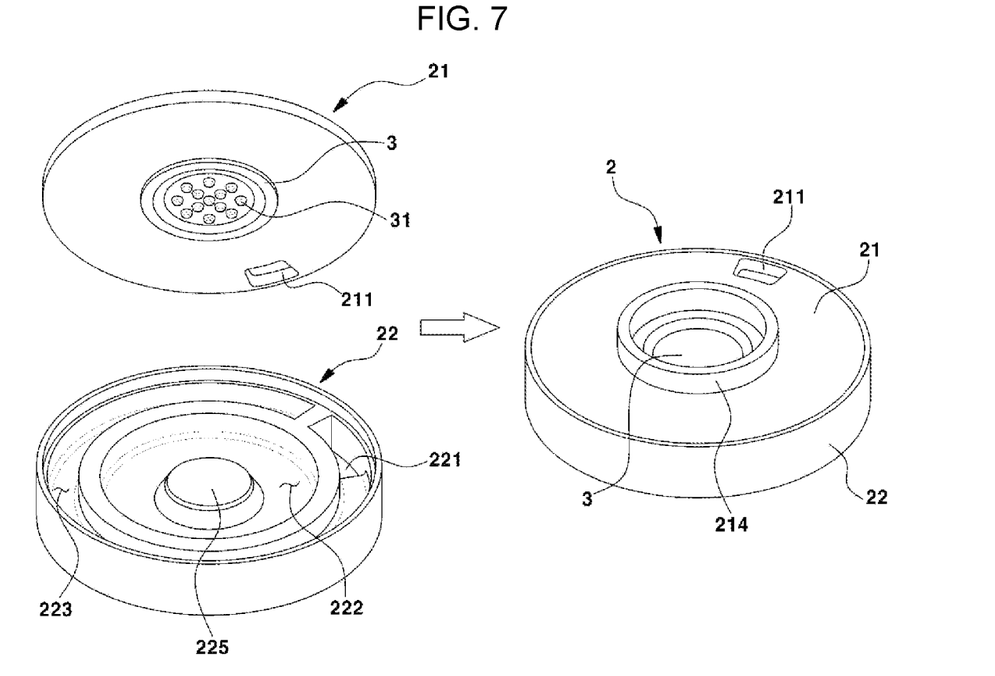
FIG. 7 is a view showing a damping means according to an exemplary embodiment of the present invention.

As shown in FIGS. 2 and 7, the orifice module 2 may include an upper plate 21 having the mounting portion 212 and the partition wall 214 and a lower plate 22 having the air chamber 222 and the fluid passage 223.

The upper plate 21 may include the mounting portion 212 and the partition wall 214 formed at the center portion thereof. The partition wall 214 may be formed to protrude from a top end portion of the upper plate 21 and mounted outside the mounting portion 212. Furthermore, the upper plate 21 may be provided with an upper hole 211 communicating fluidly with the fluid passage 223. The upper hole 211 allows the fluid to flow between the fluid passage 223 and the upper chamber S1.

The lower plate 22 may include the air chamber 222 formed at its center portion and the fluid passage 223 formed outside the air chamber 222. The lower plate 22 may be provided with a lower hole disposed atone side of the fluid passage 223. The lower hole 221 allows the fluid to flow between the fluid passage 223 and the lower chamber S2. The upper plate 21 may be press-fitted into an upper end portion of the lower plate 22. At the instant time, the fluid passage 223 is closed by the upper plate 21 and the air chamber 222 is sealed by both the upper plate 21 and the membrane 3. Furthermore, a bottom portion of the lower plate 22 mounted on a lower surface of the air chamber 222 may protrude upward to form the stopper 224.

Furthermore, as shown in FIG. 1, the lower portion of the insulator 1 may be integrally formed on an internal surface of an external pipe 4. The lower chamber S2 provided inside the insulator 1 may be sealed by a diaphragm 5 mounted below the orifice module 2. In other words, the lower chamber S2 may be sealed by both the orifice module 2 and the diaphragm 5. A lower end portion of the external pipe 4 may be curled toward the diaphragm 5 to support an edge portion of the diaphragm 5.

The insulator 1 may be inserted into and fixed to a casing portion 61 of a mount bracket 6 by the external pipe 4. The external pipe 4 may be press-fitted into the interior of the casing portion 61.

The mount bracket 6 may include the casing portion 61 and a bracket portion 62 integrally formed with the casing portion 61. The bracket portion 62 may be fixed to a vehicle body or a chassis frame of the vehicle.

An upper end portion of the insulator 1 may be lowered by load depending on weight of the engine when the mount core 11 is coupled to the engine and then separated from an upper end portion of the casing unit 61.

Figure 8:
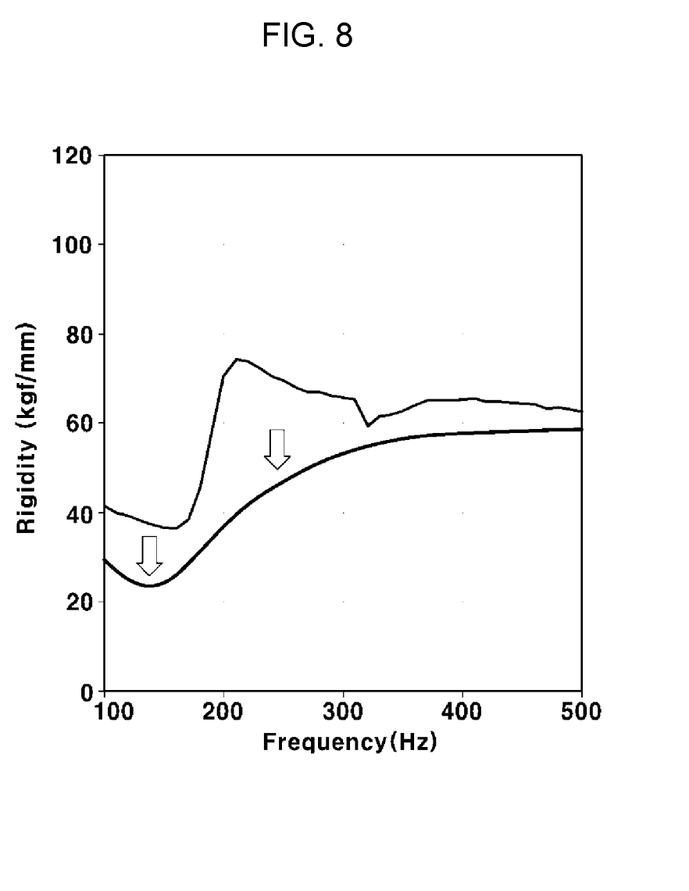
FIG. 8 is a graph showing effect in which dynamic characteristics of the engine mount are shifted downward.

The engine mount as configured above can reduce generation of negative pressure in the upper chamber S1 by the air chamber 222 so that it is possible to prevent occurrence of a cavitation phenomenon due to generation of the negative pressure as well as generation of noise due to cavitation. Furthermore, the membrane mount 3 can vibrate upwards and downwards by a pressure difference between the upper chamber S1 and the air chamber 222 which are mounted above and below the membrane 3 respectively, so that dynamic characteristics in the high frequency band are also improved (see FIG. 8).

Consequently, the fluid-sealed engine mount according to exemplary embodiments of the present invention makes it possible to minimize negative pressure to be generated in the upper chamber when the mount core is moved upwards and improve vibrational noise of the membrane due to increase of the negative pressure in the upper chamber as well as generation of noise due to a cavitation phenomenon of the fluid. Accordingly, the inventive engine mount can improve dynamic characteristics in the high frequency band, increasing insulation performance and at the same time preventing generation of operational noise.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fluid-sealed engine mount apparatus comprising:
a casing plate;
an insulator mounted inside the casing plate and integrally formed on an external side of a mount core configured to be coupled to an engine, wherein the insulator includes a chamber with which fluid for insulation of vibration is sealed;
an orifice module mounted below the mount core to divide the chamber into upper and lower chambers and having a fluid passage for flow of the fluid, wherein the orifice module includes an opening hole formed in an upper center portion of the orifice module and a partition wall surrounding the opening hole, the partition wall protruding a predetermined length from the orifice module;
an air chamber provided at a center portion of the orifice module and filled with air; and
an elastic membrane mounted on the opening hole and positioned above the air chamber and below the upper chamber to seal the air chamber.

2. The fluid-sealed engine mount apparatus of claim 1, wherein the partition wall is formed to surround an upper space in the upper chamber above the membrane in a circumferential direction of the membrane.

3. The fluid-sealed engine mount apparatus of claim 2, wherein the partition wall is mounted adjacent to an inner edge portion of the membrane in the circumferential direction of the membrane.

4. The fluid-sealed engine mount apparatus of claim 1, wherein the orifice module is provided at a center portion of the orifice module with a mounting portion to which an external edge portion of the membrane is fixed, and wherein the mounting portion is provided at a center portion of the mounting portion with the opening hole formed above the air chamber.

5. The fluid-sealed engine mount apparatus of claim 4, wherein a center portion of the membrane is mounted in the opening hole, and
wherein the center portion of the membrane is pulled and moved upwards when the mount core is moved upwards by vibration of the engine.

6. The fluid-sealed engine mount apparatus of claim 5, wherein the center portion of the membrane is pressed and moved downwards when the mount core is moved downwards by vibration of the engine.

7. The fluid-sealed engine mount apparatus of claim 6, wherein the orifice module is provided at the center portion of the orifice module with a stopper mounted at a predetermined interval below the membrane, and
wherein the stopper stops downward movement of the membrane when the center portion of the membrane moved downwards contacts with the stopper.

8. The fluid-sealed engine mount apparatus of claim 7, wherein the center portion of the membrane is provided at a lower surface of the center portion of the membrane with a plurality of elastic projections protruding from the lower surface of the center portion of the membrane.

9. The fluid-sealed engine mount apparatus of claim 7, wherein an elastic sheet is provided on a top surface of the stopper, and
wherein the elastic sheet prevents the stopper from generating noise when the center portion of the membrane strikes the stopper.

10. The fluid-sealed engine mount apparatus of claim 4, wherein the orifice module includes:
an upper plate having the mounting portion and the partition wall, and
a lower plate having the air chamber and the fluid passage.

11. The fluid-sealed engine mount apparatus of claim 10, wherein the upper plate includes an upper hole communicating fluidly with the fluid passage.

12. The fluid-sealed engine mount apparatus of claim 10, wherein the lower chamber is provided between the lower plate of the orifice module and a diaphragm connected to the casing plate.

13. The fluid-sealed engine mount apparatus of claim 10, wherein the upper chamber is provided between the insulator and the upper plate of the orifice module.

14. A fluid-sealed engine mount apparatus comprising:
a casing plate;
an insulator mounted inside the casing plate and integrally formed on an external side of a mount core configured to be coupled to an engine, wherein the insulator includes a chamber with which fluid for insulation of vibration is sealed;
an orifice module mounted below the mount core to divide the chamber into upper and lower chambers and having a fluid passage for flow of the fluid, wherein the orifice module includes an upper plate adjoining the upper chamber and a lower plate coupled to the upper plate and adjoining the lower chamber, wherein the upper plate includes an opening hole, a partition wall, and a mounting portion, the opening hole formed in a center portion of the upper plate, the partition wall surrounding the opening hole and protruding a predetermined height from an upper portion of the upper plate and the mounting portion protruding from the partition wall toward the opening hole;

an air chamber provided at a center portion of the orifice module and filled with air; and an elastic membrane mounted above the air chamber and below the upper chamber at the center portion of the upper plate to seal the air chamber, wherein the elastic membrane is fixed to the mounting portion.

\* \* \* \* \*